Dec. 9, 1930.    W. LEWIS    1,784,457
MOLDING MACHINE
Filed Feb. 7, 1929    4 Sheets-Sheet 1
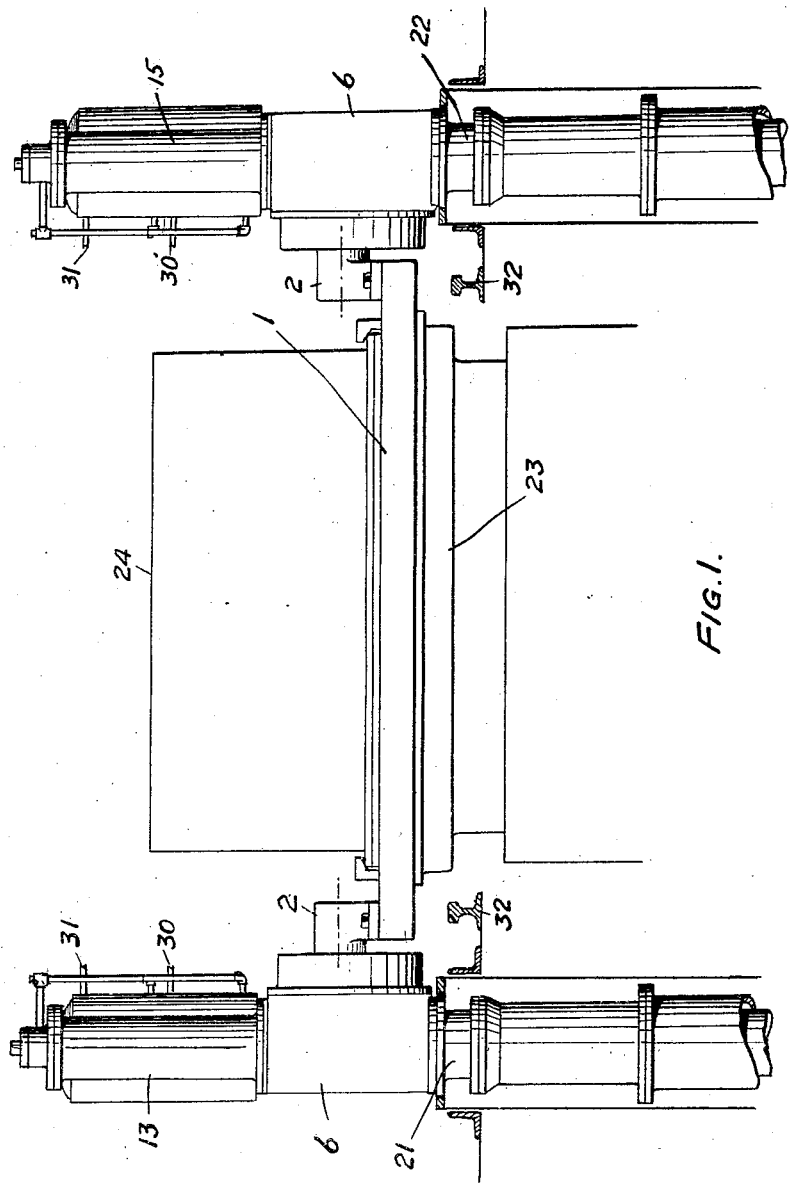
INVENTOR
Wilfred Lewis
BY
Augustus B. Stoughton
ATTORNEY.
WITNESS:
Robt. R. Mitchel.

Dec. 9, 1930.                    W. LEWIS                    1,784,457
                              MOLDING MACHINE
                        Filed Feb. 7, 1929      4 Sheets-Sheet 2
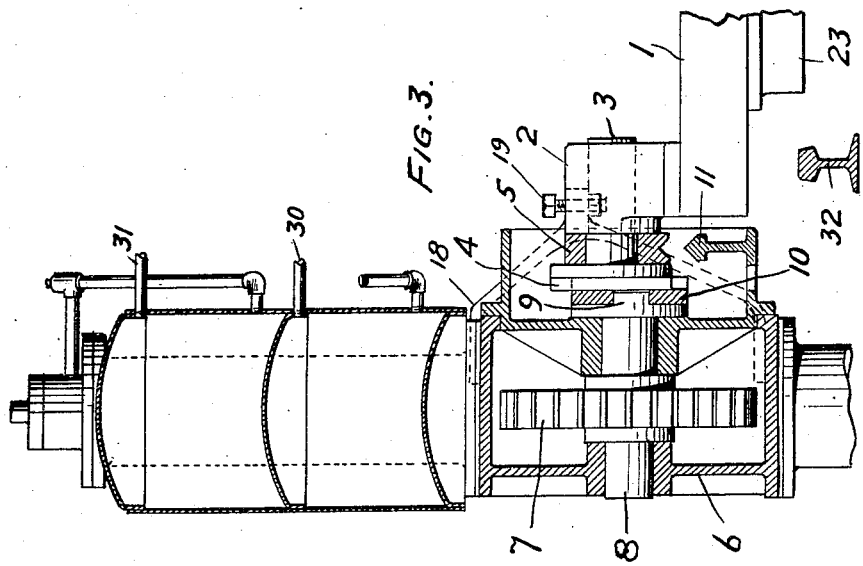
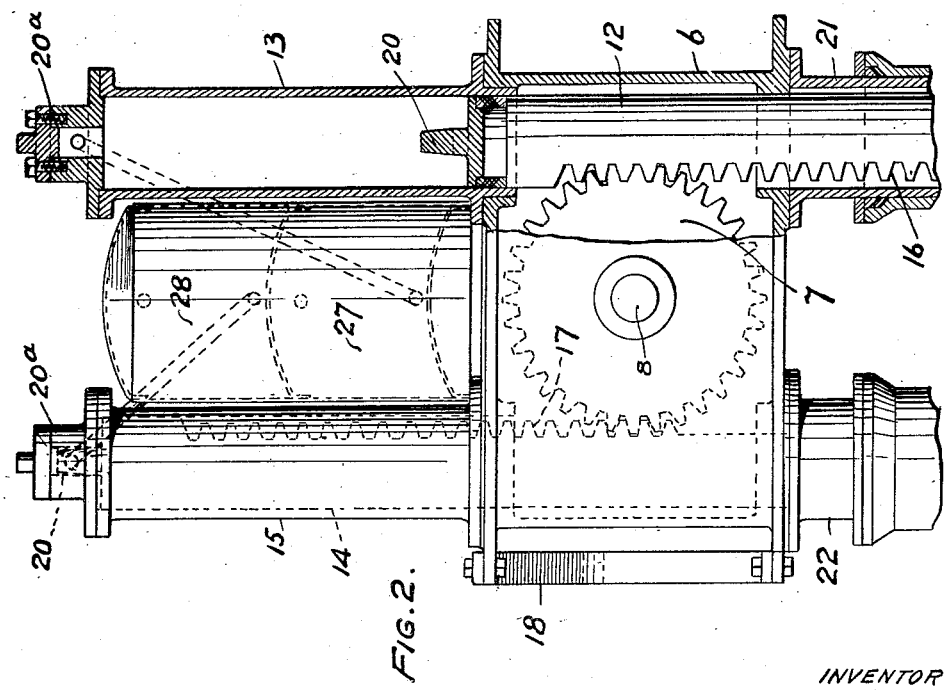
INVENTOR
Wilfred Lewis
BY
Augustus B. Stoughton
ATTORNEY.
WITNESS:

Dec. 9, 1930. W. LEWIS 1,784,457
MOLDING MACHINE
Filed Feb. 7, 1929 4 Sheets-Sheet 3

INVENTOR
Wilfred Lewis
BY
Augustus B. Stoughton
ATTORNEY.

WITNESS:
Robt R Kitchel.

Dec. 9, 1930.  W. LEWIS  1,784,457
MOLDING MACHINE
Filed Feb. 7, 1929  4 Sheets-Sheet 4

WITNESS:

INVENTOR
Wilfred Lewis
BY
Augustus B. Stoughton
ATTORNEY.

Patented Dec. 9, 1930

1,784,457

UNITED STATES PATENT OFFICE

WILFRED LEWIS, OF HAVERFORD, PENNSYLVANIA, ASSIGNOR TO THE TABOR MANUFACTURING COMPANY, OF PHILADELPHIA, PENNSYLVANIA, A CORPORATION OF PENNSYLVANIA

MOLDING MACHINE

Application filed February 7, 1929. Serial No. 338,080.

The present invention relates more particularly to rollover mechanism on trunnion plate machines to jar, rollover, and draw patterns.

Objects of the present invention are to provide for the use of flasks of different size or depth without adjustment of the mechanism of the machine; to positively control the rollover movement of the plate throughout its entire turning movement of 180° in both directions and to positively hold it at the ends of its travel; to avoid the necessity for large openings in the floor; and, generally, to improve and simplify both the construction and operation of rollover machines.

The invention comprises the improvements to be presently described and finally claimed.

The invention will be described in connection with the accompanying drawings forming part hereof and in which Figure 1 is a front view with parts in section of so much and of such parts of the machine as are necessary for an explanation of the invention.

Fig. 2 is an end view, partly in section, of the mechanism shown in Fig. 1 and drawn to an enlarged scale.

Fig. 3 is a central sectional view taken transversely of Fig. 2.

Figure 4:
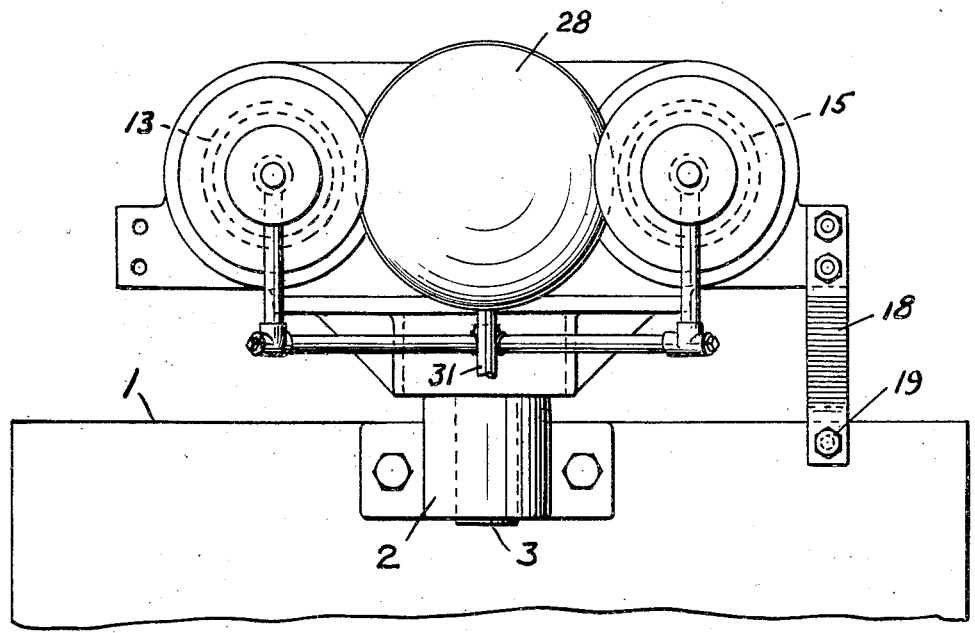
Fig. 4 is a top or plan view of the mechanism shown in Fig. 3.
Figure 5:
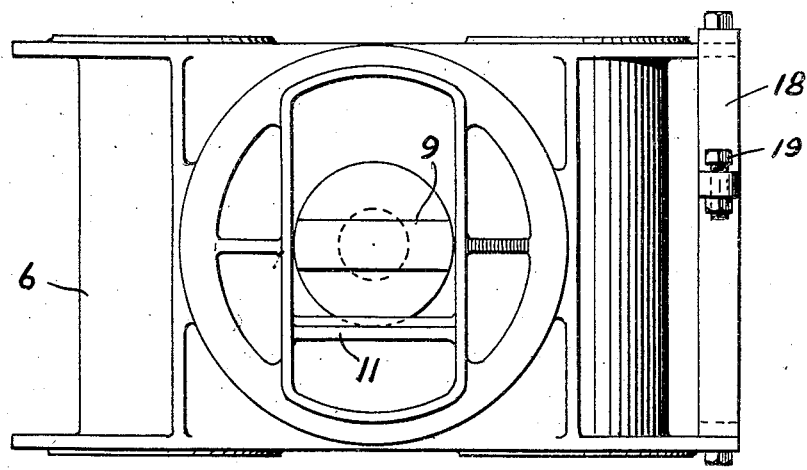
Fig. 5 is an end view of mechanism shown at the right in Fig. 3 with parts removed.

It will be understood that the mechanism at each side of the rollover plate 1, Fig. 1, is the same, so that a description of one such mechanism will be given and the corresponding parts in each such mechanism will be indicated by the same reference letters. The rollover plate 1 is provided with a trunnion stand 2 having a trunnion 3 securely attached of which the end is provided with a tongue 4 that is vertical in jarring and pattern drawing positions. In Fig. 3 the parts are shown in jarring position. 5 is a trunnion bearing and in the position shown in Fig. 3, it is carried by the trunnion 3. There is a housing 6 and it carries a revoluble toothed wheel 7 provided with a shaft 8 having a tongue 9 generally horizontal in jarring and pattern drawing positions. 10 is an Oldham coupling ring having grooves on opposite faces and disposed at right angles and adapted respectively to receive the tongues 4 and 9. A cross bar 11 provided on the housing 6 is adapted to lift the trunnion bearing 5 and rollover plate 1 as will be hereinafter described. The housing 6, when lifted, brings the shaft 8 and the trunnion 3 into substantial axial alignment while at the same time the bar 11 supports the bearing 5. There are oppositely acting rollover plungers and cylinders 12 and 13 and 14 and 15, and they are equipped with racks 16 and 17 engaging the toothed wheel 7. There is a stop 18 on the housing shown as provided with an adjusting screw 19, and its purpose is to limit the turning movement of the rollover plate 1 in one direction. The turning movement of the plate 1 is limited also by stops 20 provided on the ends of the plungers 13 and 14 which cooperate with suitable provisions 20ª on the end of the cylinders 13 and 15. There are draw plungers 21 and 22 for raising and lowering the housing 6 and as a matter of convenience the racks 16 and 17 are arranged in a hollow space provided within the same.

A flask 24 having a pattern and filled with sand is mounted on the rollover plate with the pattern next the rollover plate. As shown in Figs. 1 and 3, the rollover plate is supported by the table 23 of a jarring molding machine which is too well understood to require detail description or illustration.

Figure 6:
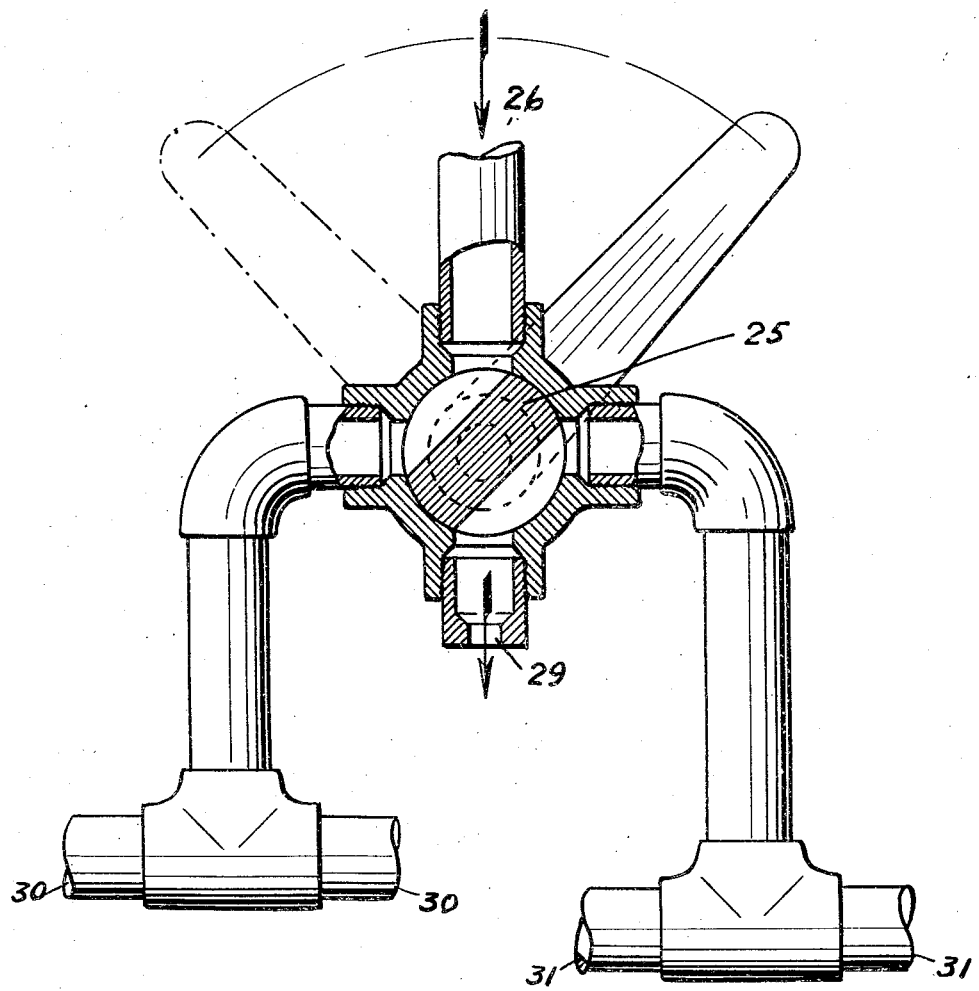
Fig. 6 illustrates, partly in section and partly in elevation, manually operated means for controlling the rollover and pattern drawing operations of the machine.

The rollover plate 1, flask 24 and pattern are jar-rammed by rising and falling movements of the table 23. During this operation the tongue on the trunnion shaft slides in the grooves in the Oldham coupling ring 10, which is in vertical position, and the housing 6 and the shaft 8 remain at rest, Fig. 3. In order to roll over the plate 1, flask 24, and pattern for pattern drawing, the housing 6 is raised together with all the parts that it carries by the draw plungers 22, thus aligning the shafts 8 and 3 and lifting them high enough to provide room for the flask. Prior to that, the valve 25, Fig. 6, is turned in proper position for admitting air under pressure by way of 26 to one of the oil tanks 27 or 28, and for connecting the other of the oil tanks to exhaust by way of 29. The valve shown in Fig. 6 is connected by the pipe 30 to the corresponding tanks at the ends of the machine and also by the pipe 31 to the other corresponding tanks at the end of the machine. The result of this is that the stop 20 is held against the abutment 20ª until the draw plungers have raised the housing and parts carried thereby sufficiently high to afford proper clearance for rolling over the flask. Then when the flask is to be rolled over, the plunger 12 is raised and the plunger 14 lowered, so that the toothed wheel 7 is turned and with it the table 1 and flask with a turning movement that is controlled in each direction by fluid friction.

In consequence of this the unbalanced weight of the flask and its carrier, as they are turned, may assist or resist the turning movement by gravity, without greatly affecting the speed. The projections 20 on the ends of the plungers throttle the passage of oil at the intake and outflow and thus the starting and stopping movements of the plungers and of the flask are softened. At the end of the turning movement, the rollover plate 1 comes to rest on the stop 19, Fig. 4 and the projection 20 on the plunger 12 comes to rest on the abutment 20ª on the cylinder 13, thus the rollover plate is properly held in horizontal position. Then the table 23 may be lowered and a suitable car run in on the rails 32, and by means of the draw plungers the housing can be lowered to position the flask on the car. Then after unclamping the pattern plate is raised by the draw plungers, drawing the pattern from the flask.

It should be said that the draw plungers on both sides of the machine are coupled to move together by suitable squaring devices such as cables or a squaring shaft with parallel arms and links at each end of it, not shown because too well understood. While the operating valve Fig. 6 may take various forms with which those skilled in the art are familiar, it should be observed that the size of the air outlet, 29, is an important factor in the speed control. It must not be too large nor too small and its proper size can readily be determined by trial using pressure gages on the rollover cylinders when turning the plate 1 in the direction assisted by gravity. When turning in this direction the moment of the unbalanced load tends to carry the driving plunger faster than liquid would otherwise enter its cylinder, causing a reduction of pressure which should not be allowed to produce a vacuum resulting in what is known as "water-hammer."

This tendency is checked by pressure in the opposing cylinder, however, and so long as there is at least atmospheric pressure in the driving cylinder there will be no danger of water-hammer. On the other hand, too small an outlet, 29 will consume unnecessary time in rolling but beginning with a small outlet, this can be gradually enlarged until the proper size in any case has been determined by trial. When the turning movement is resisted by gravity, as it will be when inverting the unloaded or lightly loaded plate, 1, from jarring position, the speed will naturally be subnormal but these conditions are unusual and not generally advisable for the most efficient use of the machine, in which, however, ample power is provided for any contingency. In any case, however, the turning speed will be under the control of fluid friction which depends chiefly upon the size of the passageways open to the flow of liquid, and in this way any desired speed can be provided for.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. Rollover mechanism on trunnion plate machine to jar, rollover, and draw patterns comprising, in combination, a rollover plate having a trunnion stand and a trunnion of which the end is provided with a tongue vertical in jarring and pattern drawing positions, a trunnion bearing, a housing having a revoluble toothed wheel provided with a shaft having a tongue generally horizontal in said positions, an Oldham coupling ring having grooves on opposite faces and disposed at right angles and adapted to receive said tongues, a cross bar provided on the housing and adapted to lift said trunnion bearing to approximately align the trunnion and shaft for rollover and pattern drawing and to drop clear of said bearing for jarring, oppositely acting rollover plungers having racks engaging said toothed wheel, two-way limit stops on the housing for positioning the plate for pattern drawing, and draw plungers for raising and lowering the housing and parts carried thereby.

2. Rollover mechanism on trunnion plate machine to jar, rollover, and draw patterns, comprising in combination a rollover plate having a trunnion stand and a trunnion of which the end is provided with a tongue vertical in jarring and pattern drawing positions, a bearing for the trunnion, a pair of draw plungers having thereon a housing provided with a pair of oppositely acting rollover plungers, means on said housing for lifting and for dropping below said bearing, a toothed wheel turnably mounted in said housing and having its journal end provided with a tongue horizontal in pattern drawing and jarring positions, an Oldham coupling disk having on opposite sides grooves disposed at right angles and receiving said tongues, and rack and pinion mechanism interposed between the toothed wheel and said plungers.

3. In a rollover, jarring and pattern drawing molding machine the combination of a rollover plate having a trunnion and a trunnion bearing, a housing having a support adapted to drop below the bearing and to support the same, a toothed wheel mounted in the housing and having a journal, connections between the journal and trunnion, and oppositely acting plungers mounted on the housing and having toothed racks engaging said toothed wheel and adapted to impart positive turning motion in both directions to the plate between limit stops provided on the housing.

4. In a rollover, jarring and pattern drawing molding machine, the combination of a rollover plate having a trunnion, a journal, connections between the journal and trunnion for permitting relative up and down and opposing relative turning motion thereof, limit stops for the rollover plate, and oppositely acting rack and pinion and plunger mechanism for turning the plate between its stops with a motion controlled in both directions independently of the distribution of the flask load.

5. In a rollover, jarring and pattern drawing molding machine, the combination of a housing, drawing plungers and cylinders carrying the housing, oppositely acting rollover plungers and cylinders carried by the housing and provided with racks arranged in spaces provided in the drawing plungers and cylinders, a toothed wheel having a journal mounted in the housing, limit stops provided on the housing, a rollover plate having a trunnion and arranged to be lifted by the housing and to be independently supported clear of the housing, and a connection between the journal and trunnion adapted to transmit turning motion and to permit freedom of up and down motion.

6. In a rollover, jarring and pattern drawing molding machine, the combination of a rollover plate having a trunnion, a journal, connections between the journal and trunnion for permitting relative up and down and for opposing relative turning motion thereof, oppositely acting rack and cylinder and plunger mechanism for turning the plate with a motion controlled in both directions, a housing carrying said journal and said mechanism, and fluid pressure tanks for said cylinder and plunger mechanism mounted on said housing.

WILFRED LEWIS.